Sept. 28, 1965 L. C. WILLIAMS ETAL 3,208,895
APPARATUS FOR MOUNTING FILMS AND OTHER INSERTS IN CARDS
Original Filed March 28, 1957 5 Sheets-Sheet 1
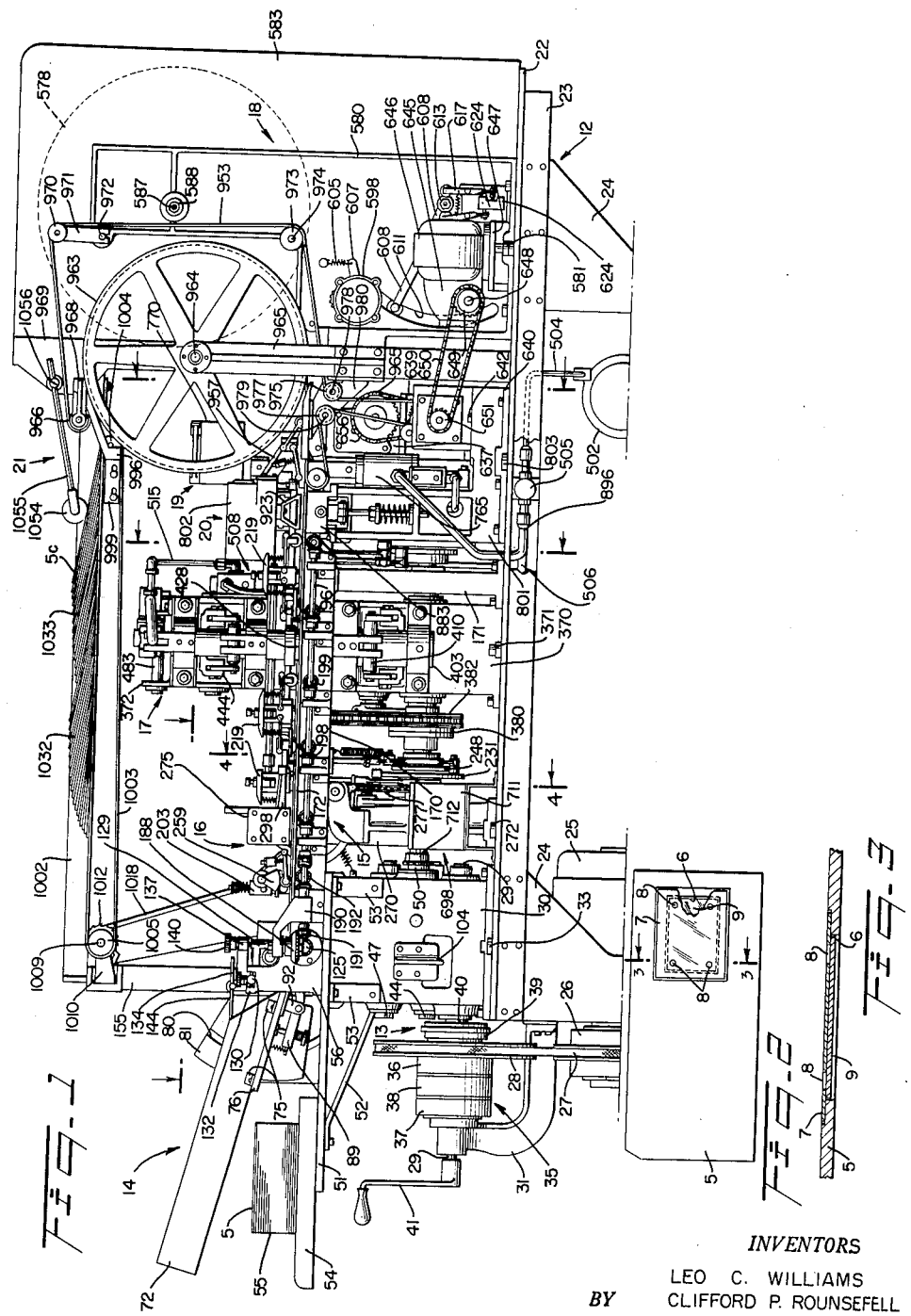
INVENTORS
LEO C. WILLIAMS
CLIFFORD P. ROUNSEFELL
BY
*Bauer and Seymour*
ATTORNEYS

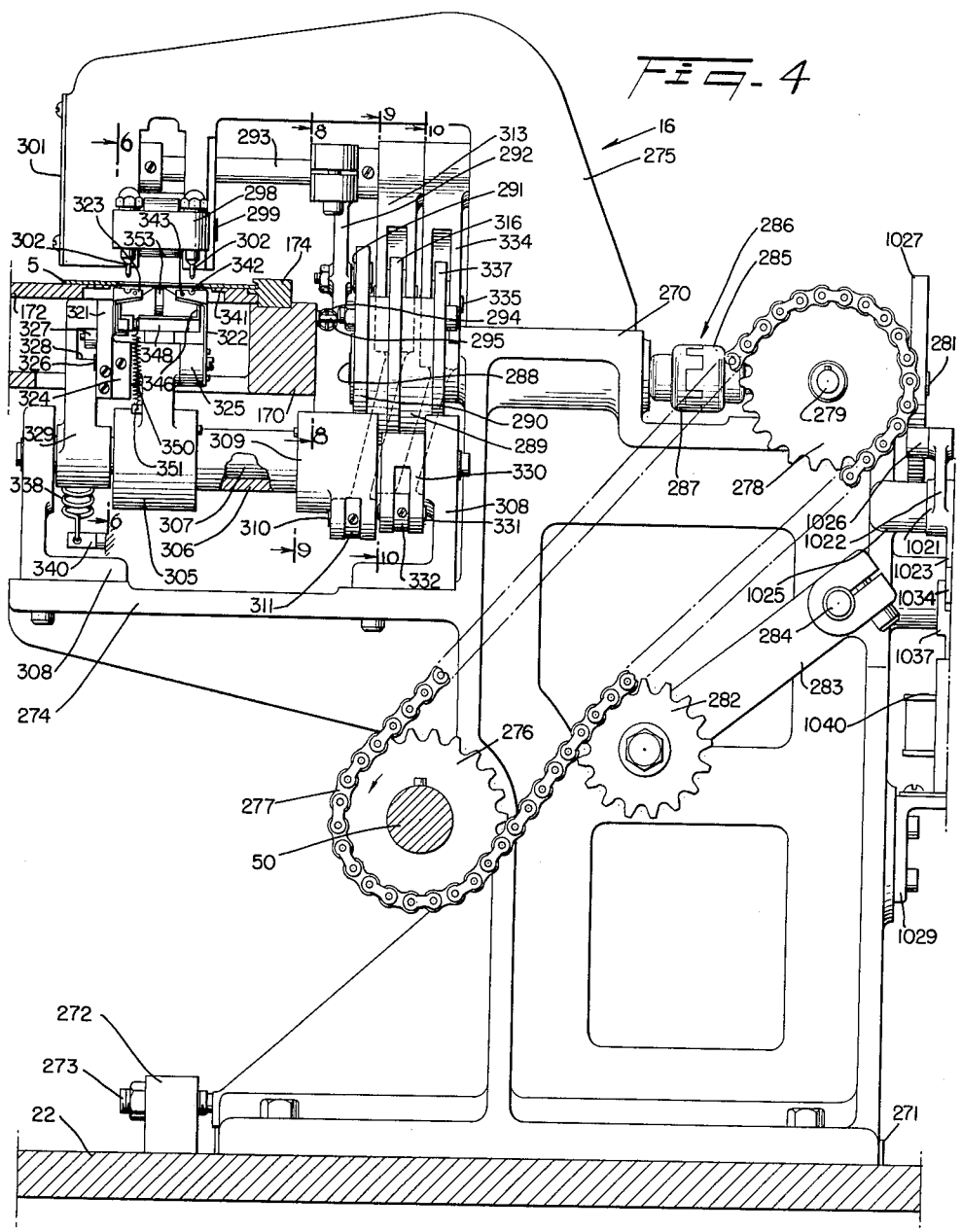

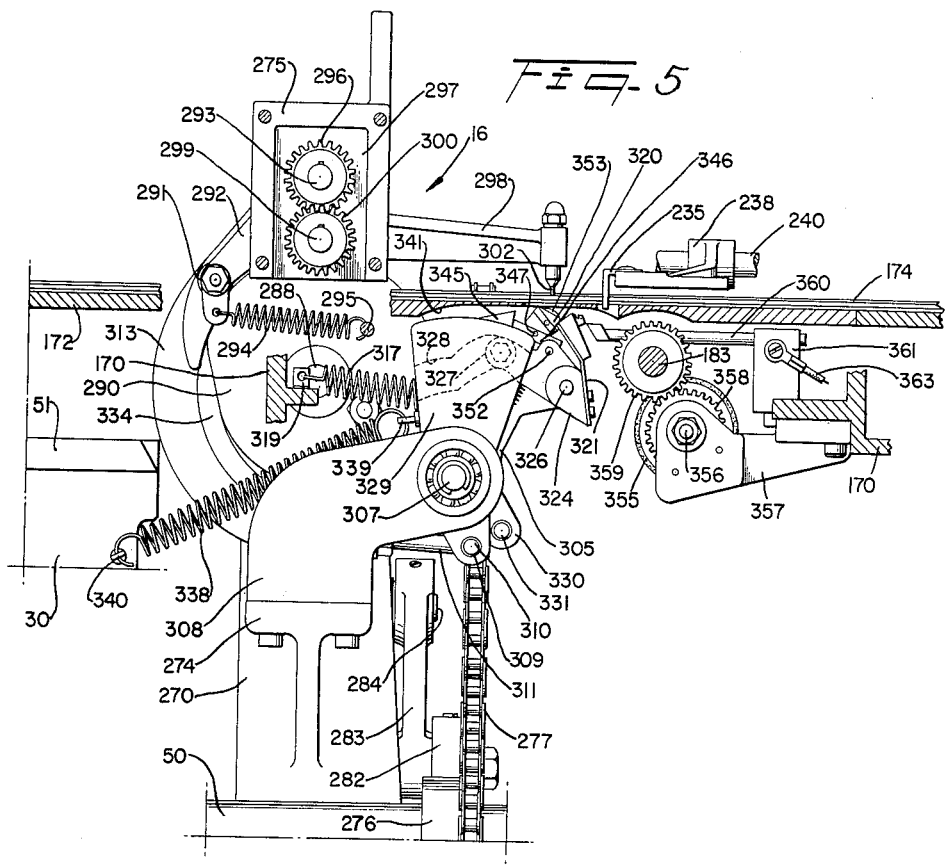

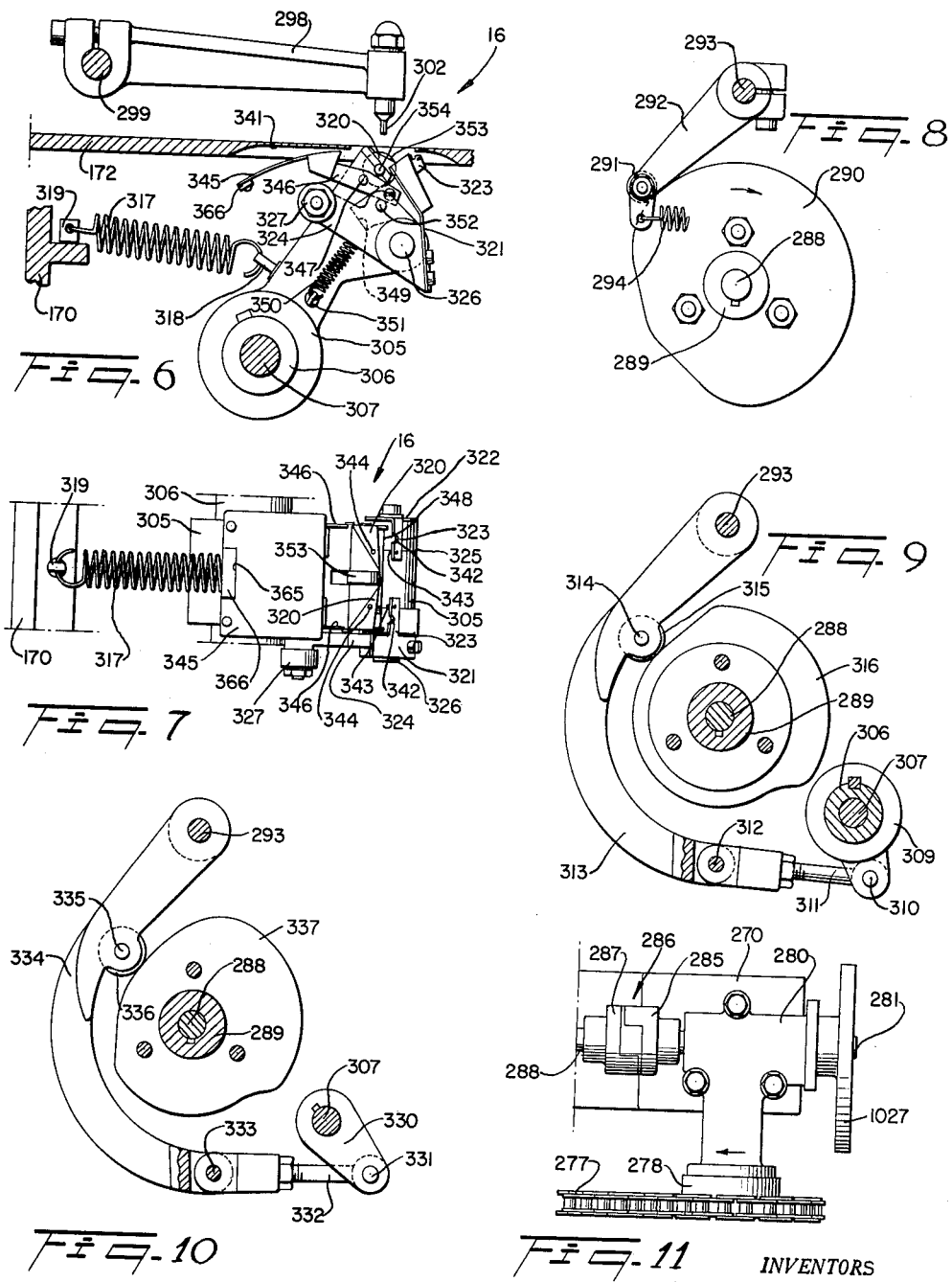

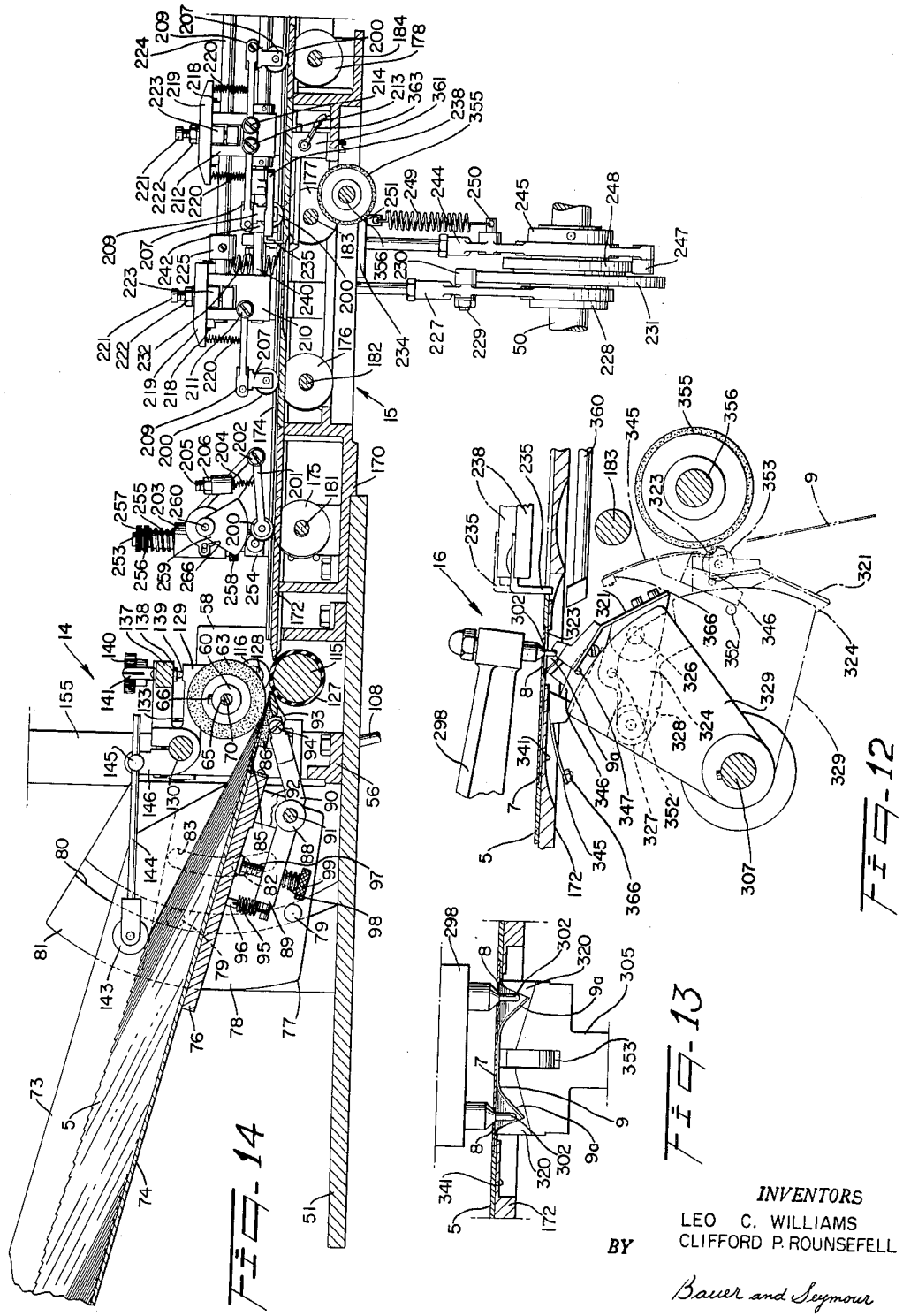

United States Patent Office 3,208,895
Patented Sept. 28, 1965

3,208,895
APPARATUS FOR MOUNTING FILMS AND OTHER INSERTS IN CARDS
Leo C. Williams, Pearl River, N.Y., and Clifford P. Rounsefell, Hillsdale, N.J., assignors to Minnesota Mining and Manufacturing Company, St. Paul, Minn., a corporation of Delaware
Original application Mar. 28, 1957, Ser. No. 649,159, now Patent No. 2,987,099, dated June 6, 1961. Divided and this application July 27, 1960, Ser. No. 45,631
20 Claims. (Cl. 156—352)

This invention relates to an apparatus for processing classification cards, each card having an aperture, an adhesive sheet carried by the card and extending over the aperture and a protective cover sheet carried in the card aperture and removably mounted to the adhesive sheet.

This application is a division of my copending patent application Serial No. 649,159 filed March 28, 1957, now U.S. Patent No. 2,987,099, issued June 6, 1961 and said copending application, as originally filed, forms a part of this disclosure and is incorporated herein by reference.

Another object is to provide an apparatus of novel construction which will effectively remove a protective cover sheet from within an aperture in a card.

Another object is to provide an apparatus for feeding classification cards to a mechanism for removing the protective cover sheet and for feeding the stripped card to another card processing mechanism.

Still another object is to provide a novel mechanism for effectively removing an adhered sheet from a blank or panel, such as a card.

Another object is to provide a novel method of and mechanism for automatically stripping, by a peeling action, an adhered protective cover sheet from within an aperture in a card.

A further object is to provide a novel mechanism of the character and for the purpose above described, wherein the stripping of the cover sheet from the card is advantageously and positively effected by and through relative movements of said card and said mechanism.

A still further object is to provide a cover sheet stripping mechanism as described above, having associated therewith in a novel manner automatic control means to cause a desired control function upon failure of said mechanism to strip the cover sheet from a card.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a general assembly view in side elevation of an apparatus which will effectively remove a protective cover sheet from within an aperture in a card and shown embodied with a card feeding means and other card processing mechanisms;

FIG. 2 is a detailed face view of one form of card as initially prepared and presented to the protective cover removing machine, the film mounting sheet on said card having a portion thereof broken away for purposes of clearer illustration;

FIG. 3 is a fragmentary vertical sectional view of said card, said view being on an exaggerated scale and being taken on the line 3—3 of FIG. 2;

FIG. 4 is an enlarged detail elevational view, partly in section, of the cover sheet stripping unit as seen approximately from the position indicated by the line 4—4 of FIG. 1, certain of the card conveyor parts being omitted and one of the parts of said unit having a portion thereof broken away for purposes of clearer illustration;

FIG. 5 is an elevational view, partly in section, of said cover sheet stripping unit looking from the left of FIG. 4, including an associated sweep roller device, a card stop and the cover sheet detecting device, the card conveyor structure having portions thereof broken away for purposes of clearer illustration;

FIG. 6 is an enlarged fragmentary vertical sectional view taken substantially on the irregular line 6—6 of FIG. 4;

FIG. 7 is a detail top plan view of the cover sheet gripping mechanism shown in FIG. 6;

FIG. 8 is a fragmentary vertical sectional view taken substantially on the line 8—8 of FIG. 4;

FIG. 9 is a fragmentary vertical sectional view taken substantially on the irregular line 9—9 of FIG. 4, the cam lever having a portion thereof broken away for purposes of clearer illustration;

FIG. 10 is a fragmentary vertical sectional view taken substantially on the irregular line 10—10 of FIG. 4, the cam lever having a portion thereof broken away for purposes of clearer illustration;

FIG. 11 is a detail top plan view of the driving means for the cover sheet stripping unit;

FIG. 12 is a fragmentary elevational view, partly in section and on an enlarged scale, showing the parts of the cover sheet stripping unit in their respective operative positions and said unit in the process of stripping a cover sheet from a card;

FIG. 13 is an enlarged detail elevational view, partly in section, showing the operation of the cover sheet stripping and deflecting pin elements; and FIG. 14 is an enlarged side elevational view with certain parts broken away for purposes of clearer illustration.

The apparatus constructed in accordance with the present invention and chosen for the purpose of illustration is particularly adapted for mounting individual image bearing frames of micro-film in cards of the type commonly employed in connection with statistical, tabulating and record card sorting systems and machines, and for preparing such cards for this purpose. Mounting of film frames in cards of this character advantageously provides such cards with a picture record of the data recorded or to be recorded thereon, and facilitates classifying and sorting of the film frames, as well as filing and indexing thereof, as to subject matter. It is to be understood that the invention is not so limited and that the principles herein described are applicable to the preparation of a variety of different cards and to the mounting of a variety of different inserts in the cards for the described and other processes.

There is shown in FIGS. 2 and 3, one card, indicated at 5, of the known statistical or tabulating machine type, which is capable of being handled in the machine of the illustrated embodiment and for which said machine has been primarily designed. This card 5 is oblong in shape and is formed of single ply cardboard or heavy relatively stiff paper material, and as shown, has been pre-prepared for the mounting of a frame or micro-film or other insert of like size therein. The cards 5, as presented to the machine, are each in the form shown in FIGS. 2 and 3, and as shown in said figures, each card 5 contains a generally rectangular aperture 6 extending therethrough and of an appropriate size to receive a frame of micro-film or other insert of equivalent size therein. The aperture 6 is located centrally between the upper and lower longitudinal edges of the card 5, and inwardly a selected distance from one side edge of said card, and said aperture is made of such width or vertical dimension that it will accurately receive the uncut longitudinal edges of the film frame or other insert. Adhesively secured to one face of the card 5 and covering the entire aperture 6 is a very thin generally rectangular sheet 7 of transparent material which is coated on the inner surface thereof with a layer of pressure sensitive adhesive. To eliminate projecting edges and to avoid increasing the thickness of the card 5, the sheet 7 is preferably embedded in the face of the card so that the outer face of said sheet lies flush with the adjacent face of the card. The sheet 7 is utliized to retain the film frame or other insert in the aperture 6 in the card 5 and to firmly hold said film frame or insert when the same is inserted into said aperture and pressed against said sheet as hereinafter described. Disposed within the aperture 6 and removably adhering to the sheet 7, is a very thin temporary cover sheet 9 of readily removable material, such as glassine paper, said cover sheet serving to protect the adhesive on sheet 7 during all handling of the card prior to loading of a supply of said cards in the machine.

For purposes to be hereinafter described, the sheet 7 on the cards 5 as presented to the machine, is provided with four small holes 8 which are located inwardly from the four corners of the card aperture 6 alike short distances on diagonal lines extending across said corners. It will be apparent that any card which has been prepared as above described and which is of the same or substantially the same width or vertical dimension as that of the described card 5 may be handled in the machine of the illustrated embodiment.

In the embodiment of the invention herein disclosed, the machine, as shown in FIG. 1, includes the following:

(1) A supporting base indicated generally at 12 which is adapted to support various mechanisms of the machine, including a suitable driving mechanism indicated generally at 13;

(2) A card feeder indicated generally at 14 for feeding the cards 5 one after another in timed relation from a supply stack of said cards;

(3) A card conveyor indicated generally at 15 for conveying the cards 5 one after another in spaced relation along a horizontal rectilinear path;

(4) A cover sheet stripping mechanism indicated generally at 16 for removing the cover sheet 9 from the card 5;

(5) A die mechanism indicated generally at 17 for dieing-out the central portion or section of the adhesive sheet 7 on the card 5 so as to form a window opening in said sheet of corresponding shape to the card aperture 6 but of smaller dimensions and lying within the area of said aperture, leaving a margin of exposed adhesive extending around the aperture.

(6) A mechanism indicated generally at 18 for unwinding a supply roll of micro-film or other insert strip;

(7) A feeding mechanism indicated generally at 19 for feeding the film or other insert strip to and in registry with strip severing means;

(8) A cutting, transferring and applying mechanism indicated generally at 20 for severing the film or other insert strip into individual frames or sections, transferring each severed frame or section to card mounting position and applying it in the aperture 6 in the card 5 and against the adhesive sheet 7 on said card; and (9) A card delivering and stacking mechanism indicated generally at 21 for receiving the finished cards, turning them over end-for-end, and stacking the same in overlapping fanned-out relation and in separated batches of a predetermined number.

The above identified copending application Serial No. 647,159 contains a detailed description of the various mechanisms shown in the drawings and set forth above.

The supporting base 12 rests on the machine foundation and comprises a generally rectangular horizontal plate or platform 22, a pair of longitudinally extending bars 23 located at opposite sides of said plate, and two transversely extending standards 24 located at opposite ends of said plate, said plate and said bars being bolted or otherwise suitably secured to said standards, and said plate being also bolted or otherwise suitably secured to said bars. The movable parts of the protective cover stripping mechanism 16, together with the card feeder 14 and conveyor 15, are all preferably driven by the driving mechanism 13 which includes an electric motor 25. The motor 25 is carried by the supporting base 12 beneath the platform 22, and is preferably mounted on said base in a suitable manner for pivotal up and down movement for a purpose to be presently described. The motor 25 which is of the single phase type is supplied with electrical current from a suitable source and is controlled for starting and stopping purposes by a suitable manually operated switch.

Fixed on the armature shaft of the motor 25 is a pulley 26 which is preferably of the well-known variable diameter or speed type whereby the speed of operation of the machine may be regulated, as desired, through raising or lowering of said motor. Passing around and driven by the pulley 26 is a belt 27 which also passes around and drives a larger diameter pulley 28. This pulley 28 is loosely mounted on a short shaft 29 which extends longitudinally of the machine and is journalled in suitable bearings provided in the opposed walls of a gear box 30 and in a bracket 31 which is located outwardly of and spaced from said gear box. The pulley 28 is thus driven continuously by the motor 25 when the latter is started. The bracket 31 is bolted or otherwise suitably secured to the adjacent standard 24 of the base 12, and the gear box 30 is mounted on and bolted to the platform 22 of said base.

The shaft 29 is driven by the pulley 28 through a conventional magnetic clutch and brake unit indicated generally at 35, said unit including an annular driving magnet 36 which freely surrounds said shaft and is bolted or otherwise suitably secured to said pulley, an annular braking magnet 37 which freely surrounds the shaft and is bolted or otherwise suitably secured to the bracket 31, and an annular clutch disc 38 of magnetic material which is disposed between the magnets 36 and 37 and is engaged over and drivably keyed to said shaft, said key connection providing for limited axial movement of said clutch disc on said shaft toward and away from said driving and braking magnets. Surrounding and suitably fixed to the hub of the pulley 28 and insulated therefrom is a pair of slip rings 39 and 40 for conducting electrical current to the driving magnet 36. It will thus be apparent that when the driving magnet 36 is energized the shaft 29 will be rotated through magnetic engagement of the clutch disc 38 with said driving magnet, and that when the braking magnet 37 is energized the shaft 29 will be stopped and held against further rotation through magnetic engagement of said clutch disc with said braking magnet. There is provided a handle 41 by means of which the shaft 29 and the various mechanisms connected therewith may be turned or operated manually, when desired, said handle being ordinarily removed from the shaft, and when used it is engaged over the outwardly projecting end of siad shaft and is connected thereto in a suitable manner.

A gear box 30 contains a series of intermeshed gears whereby power from motor 25 is connected to and drives a shaft 50 which, in turn, drives the card feeding mechanism, conveyor mechanism and protective cover sheet removing mechanism in timed relation to each other.

The upper end of the gear box 30 is normally closed by a plate 51 which is adapted to support the card feeder 14 for feeding the cards 5 one after another in timed relation from a supply stack thereof. The plate 51 is bolted or otherwise suitably secured to a series of brackets 52 and 53 which, in turn, are bolted or otherwise suitably secured to the gear box 30. The plate 51 projects rearwardly beyond the gear box 30 and has secured thereto a shelf 54 which is adapted to support a reserve stack 55 of the cards 5 in a convenient position for jogging thereon and loading into the card feeder 14 to replenish the supply of cards in said feeder during the normal operation of the machine.

The cards 5 are fed to the card conveyor 15 one at a time by any suitable means such as the card feeder illustrated and described in our said copending application. The card conveyor 15 serves to advance and present successive cards to the protective cover sheet removing mechanism which is spaced at one side of the conveyor.

As shown, the conveyor 15 comprises a generally rectangular open frame 170 which is of one-piece construction and is suitably ribbed at spaced points therealong to strengthen and stiffen the same. The frame 170 is supported at the rear thereof on the plate 51 and at the front thereof on a standard 171 and is bolted or otherwise suitably secured to said plate and said standard. The standard 171 is bolted or otherwise suitably secured to the base platform 22 and projects upwardly therefrom. The frame 170 is provided at the top thereof with a plate 172 the upper surface of which is located substantially in the plane of the top of the feed roll 115 and serves to support the cards 5 during movement thereof along the conveyor and while they are temporarily at rest on said conveyor for performance of the card preparing and film mounting operations thereon, as hereinafter described. The plate 172 extends substantially across the entire width of the frame 170 and along the entire length of said frame and may be made in one piece, but for the sake of convenience in gaining access to the various mechanisms for inspection and adjustment purposes, said plate is made in several sections which are individually secured to the frame 170 as by clamp screws.

Suitably secured to the top of the frame 170 at one side thereof and located a slight distance outwardly of the normal line of travel of the cards 5 from the feeder 14 is a side guide in the form of a grooved bar 174 which extends substantially the entire length of the conveyor and projects above and below the upper surface of the sectionalized plate 172. The side guide bar 174 serves to register the successive cards 5 in proper lateral position on the conveyor for accurate performance of the protective cover stripping operation.

Disposed within the frame 170 and located relatively close to the side guide bar 174 is a plurality of lower feed rollers 175, 176, 177, and 178, which are spaced longitudinally of said frame and are disposed at an angle with respect to said side guide bar and the normal line of travel of the card 5 along the conveyor. The rollers 175 to 178, inclusive, project through suitable clearance openings in the sectionalized plate 172 to substantially the upper surface of said plate, and said rollers are arranged so that the angle of inclination of each of the rollers 176 to 178, inclusive, is the same and of a slight degree, and that the angle of inclination of the first roller 175 is greater than that of the rollers 176 to 178, inclusive. By virtue of the described arrangement of the rollers 175 to 178, inclusive, and of the associated side guide bar 174, each card 5 received from the feeder 14 by the first angle roller 175 will be advanced by said roller to the second angle roller 176 and during such movement said card will be quickly moved by the roller 175 laterally on the conveyor and registered against said side guide bar, and the registered card will thereafter be maintained against the side guide bar and moved therealong by the other angle rollers 176 to 178, inclusive, with a minimum amount of friction and with little or no crowding of the card against said side guide bar. The spacing between the rollers 175 to 178, inclusive, is less than the length or longer dimension of the cards 5 so that the latter are always under the control of said rollers to insure continued advancing movement thereof along the conveyor. The rollers 175 to 178, inclusive, in the described lateral position thereof engage the cards 5 between the aperture 6 in said cards and the adjacent marginal side edge of the cards. The peripheries of the rollers 175 to 178, inclusive, are preferably roughened, as by knurling the same, so as to provide increased traction of said rollers on the cards.

The inclined rollers 175 to 178, inclusive, are suitably fixed on and rotated by correspondingly inclined shafts 181, 182, 183, 184, respectively, which extend transversely of the conveyor frame 170 and are journaled at opposite ends thereof in suitable bearings provided in said frame. The rollers 175 to 178, inclusive, are driven continuously and at the same surface speed as that of the feed roll 115 by a suitable mechanism as shown in our said copending application.

Cooperating with each of the driven inclined lower rollers 175 to 178, inclusive, to insure positive advancing movement of the cards 5 along the conveyor, is an upper spring-pressed rider wheel or idler pressure roller 200 which is normally disposed at the same angle of inclination as that of the lower roller with which it cooperates. The rider wheel 200 for the inclined roller 175 is journalled on and at one end of an arm 201 which is bifurcated at said end and is pivotally mounted at the other end thereof on an adjustable eccentric stud 202 which is releasably secured in a suitable manner in a bracket 203 which forms a component part of a caliper unit to be hereinafter described which advantageously utilizes the rider wheel 200 on the arm 201 as the means of said unit for gauging the thickness of each card 5 passed between the same and its cooperating lower roller 175. The arm 201 and consequently the rider wheel 200 carried thereby is yieldingly urged downwardly by a coil compression spring 204 to maintain said wheel engaged with its cooperating roller 175 or the top of a card 5 passing between the same, said spring having one end thereof engaged against said arm and the opposite end thereof engaged against a screw 205 which is adjustably threaded in the bracket 203 and is secured in adjusted position by a lock nut 206. The degree of pressure between the driven roller 175 and its cooperating rider wheel 200 may thus be regulated or adjusted as desired or required by turning the adjusting screw 205 in one direction or the other to increase or decrease the tension of the spring 204. The spring 204 is preferably engaged over a short and small diameter pin on the arm 201 and over a similar pin formed on the lower end of the adjusting screw 205 to confine said spring between said arm and said screw. The eccentric stud 202 provides for longitudinal adjustment of the arm 201 and consequently rolling adjustment of the rider wheel 200 on and relative to the driven roller 175 to accurate operating position with respect to said roller.

The rider wheels 200 cooperating with the driven inclined rollers 176 to 178, inclusive, are mounted not only for rolling adjustment on the respective rollers to proper operating positions, but to also enable the angle of inclination thereof to be varied with respect to said rollers whereby the lateral thrust imparted to the cards 5 by the cooperating inclined rollers and rider wheels may be further accurately controlled to a desired degree. Accordingly, these rider wheels 200 are each journalled on and at the lower end of a separator holder 207 which is formed at the top thereof with a round stem 208, and each of said holders is rotatably mounted by its stem 208 and at one end of a separate arm 209 which is split at said end to provide for clamping of the holder in its adjusted angular position to said arm. The sub-assembly comprising the rider wheel 200, the holder 207 and the arm 209 correlated to the driven inclined roller 176 is pivotally mounted on a bracket 210 by an adjustable eccentric stud 211 which is engaged in the other end of said arm and is releasably secured in a suitable manner on said bracket. The sub-assemblies comprising the rider wheels 200, the holders 207 and the arms 209 correlated to the driven inclined rollers 177 and 178, respectively, are pivotally mounted on a single bracket 212 by adjustable eccentric studs 213 and 214, respectively, which are engaged in the other ends of the respective arms 209 and are releasably secured in a suitable manner on said bracket. The eccentric studs 213 and 214 are the same as the stud 211 previously described. The brackets 210, and 212 are identical in construction and they are bolted or otherwise suitably secured to the conveyor frame 170 at the side guide side thereof and at suitably spaced points along said frame.

The sub-assemblies comprising the rider wheels 200, the holders 207 and the arms 209 are yieldingly urged downwardly under spring pressure so as to maintain said wheels engaged with the respective rollers 176 to 178, inclusive, or with the tops of the cards 5 passing and positioned between said rollers and their cooperating rider wheels. Also, the spring pressure exerted upon the rider wheels 200 of said sub-assemblies is controlled in a novel manner such that while the cards 5 are temporarily at rest on the conveyor and positioned against operable stop means, to be hereinafter described, for arresting the movement of the cards independently of the conveyor at predetermined points spaced along said conveyor and for holding said cards at said points for a predetermined interval against movement by the conveyor, a relatively light pressure is applied by the rider wheels upon the stopped cards so as to maintain the same against the stop means without buckling of said cards, and just as or immediately after the stop means are operated to release the stopped cards for further movement by the conveyor, a relatively heavy pressure is applied by the rider wheels upon the released cards whereby instant and positive further movement of the released cards by the conveyor will occur and is assured without slipping or lagging of the cards on said conveyor. The described variable pressure is applied to all of the rider wheels 200 in unison and is effected during each cycle of operation of the machine by elements which are constructed, mounted, operated and controlled as follows.

Each of the brackets 210, and 212 has mounted thereon for pivotal movement about a horizontal longitudinal axis, as at 218, a lever 219 which is constructed to surround the upper forked end of the bracket and to provide at the inner side thereof a longitudinal portion which, in the case of the bracket 212 overlies both arms 209 on said bracket, and in the case of the bracket 210, overlies the single arm 209 thereon. A coil compression spring 220 is disposed between the single arm 209 carried by the bracket 210 and the lever 219 on said bracket, and between each arm 209 carried by the bracket 212 and the lever 219 on said bracket. The spring 220 has one end thereof engaging against the respective arm 209 and the opposite end engaging against the lever 219 and is preferably engaged over short and small diameter pins on the arm and the lever to confine the same therebetween. Each of the levers 219 is provided in the outer portion thereof with an adjustable abutment member 221 in the form of a machine screw threaded therein and locked in adjusted position by a lock nut 222. The abutment members 221 on all of the levers 219 are arranged and adjusted to be simultaneously engaged by arms 223 which are disposed within and project outwardly from the forked upper ends of the brackets 210 and 212 and are clamped to or otherwise suitably fixed on a rock shaft 224. The rock shaft 224 extends longitudinally of the conveyor and is journalled in suitable bearings in the brackets 210 and 212.

Keyed and suitably secured to the rock shaft 224 at a suitable position therealong and preferably adjacent to and forwardly of the bracket 210 is a lever 225 which projects outwardly from said shaft beyond the adjacent side of the conveyor frame 170. Pivotally connected by a pin 226 to the free end of the lever 225 is the upper end of a cam strap 227 the lower end of which is engaged over and guided by a grooved hub 228 which is keyed and suitably secured to the cam shaft 50. Disposed above the cam shaft 50 and journalled at 229 on the cam strap 227 is a cam follower 230 which engages a cam 231 that is bolted or otherwise suitably secured to the hub 228. The follower 230 is yieldingly held in engagement with the cam 231 by a coil extension spring 232 having one end thereof connected to the lever 225 and the other end suitably connected to the conveyor frame 170. The shaft 224 is thus cam operated in one direction and spring operated in the opposite direction by the cam 231 and the spring 232, respectively, to rock all of the arms 223 on said shaft in unison. It will thus be apparent that when the arms 223, through continued rotation of the cam 231 and engagement of the follower 230 with the high part of said cam, are cam operated in unison in a clockwise direction, positive pivotal movement will be imparted to the levers 219 in unison in the same direction by said arms through engagement thereof with the abutment members 221, and consequently all of the springs 220 will be compressed in unison by said levers, thereby applying increased pressure upon all of the rider wheels 200 in unison. When the arms 223 are thereafter spring operated in the opposite direction by the spring 232 upon continued rotation of the cam 231 and engagement of the follower 230 with the low part of said cam, the levers 219 are released by said arms and caused to follow the latter by the expanding action of the springs 220, thus relieving some of the pressure upon the rider wheels 200. The springs 220 initially are of alike tension, and with the follower 230 engaged with the low part of the cam 231, the tension of said springs is adjusted by means of the abutment members 221 so that a light pressure is applied thereby upon the rider wheels 200 sufficient to hold the cards 5 against the stop means without buckling of the same and rebounding thereof from said stop means.

The stop means previously referred to for the cards 5 functions in connection with the protective cover stripping mechanism to simultaneously arrest the forward movement of successive cards on and independently of the conveyor for a predetermined interval and in predetermined operative positions with respect to said mechanisms. Accordingly, the stop means correlated to the protective cover stripping mechanism comprises, in the illustrated embodiment, a single finger 235 which is rocked in unison from an upper position in which it is out of the path of travel of the cards 5 to lower positions in which it is in the path of travel of the cards to be engaged by their leading edges. The stop finger 235 is suitably secured to the free end of a rearwardly projecting portion of an arm 238 which, in plan view, is of angular formation and projects transversely of the conveyor over the side guide bar 174. The arm 238 carrying the stop finger 235 is keyed and suitably clamped at its outer lateral end to a rock shaft 240 which extends longitudinally of the conveyor and is journalled in suitable bearings provided in the brackets 210 and 212. The stop finger 235 in its lower operative card engaging and stopping position projects downwardly beyond the upper surface of the sectionalized card supporting plate 172 through suitable clearance openings formed in said plate.

The arm 238 and consequently the stop finger 235 carried thereby are rocked in unison once during each cycle of operation of the machine in timed relation with the feeding of the cards 5 and the operation of the protective cover stripping mechanism. For this purpose, the rock shaft 240 has keyed and suitably secured thereto adjacent the lever 225 a lever 242 which projects outwardly from said shaft. Pivotally connected to the free end of the lever 242 is the upper end of a cam strap 244 the lower end of which is engaged over and guided by the hub 228 on the cam shaft 50. The cam strap 244 is retained on the hub 228 by a collar 245 suitably secured to said hub. Disposed below the cam shaft 50 and journalled on the cam strap 244 is a cam follower 247 which engages a cam 248 that is bolted or otherwise suitably secured to the hub 228. The follower 247 is yieldingly held in engagement with the cam 248 by a coil extension spring 249 having one end thereof connected at 250 to the cam strap 244 and the opposite end connected at 251 to the angle bracket 234. The rock shaft 240 is thus cam operated in one direction and spring operated in the opposite direction by the cam 248 and the spring 249, respectively, to rock the arm 238 whereby the stop finger 235 will be moved downwardly in unison by the spring 249 into the path of travel of successive cards 5 to be engaged by their forward or leading edges, and upwardly in unison by the cam 248 out of said path to simultaneously release the cards for further advancing movement by the conveyor.

The stop finger 235 is so arranged that when the forward motion of each successive card 5 is arrested by said stop finger, each card will be in proper operating position with respect to the protective cover stripping mechanism and each will still be under the influence of the continuously driven conveyor rollers 176 and 178, respectively, and the rider wheels 200 cooperating with said rollers. Under these conditions, the cards 5 will be continuously urged against the stop finger 235 and thereby held against displacement during the performance of operations thereon, the rollers 176 and 178 at this time slipping relative to their respective cards, and the pressure of the rider wheels 200 being relieved and insufficient, as hereinbefore described, to buckle said cards. When the arrested cards 5 are simultaneously released upon upward movement of the stop finger 235, each will immediately be taken over by the respective rollers 176 and 178 and the cooperating rider wheels 200 and, through increased pressure applied at this time by all of the rider wheels on the cards, as hereinbefore described, it will be instantly and positively advanced from its stop positions and moved further along the conveyor. The described downward and upward movements of the stop finger 235 occur in planes normal to the plane of travel of the cards 5, and when said stop finger is raised to release the cards engaged thereby, upward displacement of said cards with and by the stop finger is prevented by strippers which extend transversely of the path of travel of the cards and are located above said path and adjacent to the stop finger 235 and they are suitably secured to the plate 172 only at the ends thereof opposite the side guide bar 174.

As previously stated, the rider wheel 200 which cooperates with the driven inclined conveyor roller 175 to advance the successive cards 5, also advantageously serves as the means of a card calipering or excess card detecting device for gauging the thickness of each card passed between said roller and said rider wheel. The calipering or excess card detecting device functions to cause a control action of the machine, such as stopping of the machine, in the event more than one card 5 at a time is passed between the driven roller 175 and its companion rider wheel 200.

The card calipering or excess card detecting device is more clearly shown in our copending application and since the specific structure is not essential to this invention, the details are not set forth herein.

The cover sheet stripping mechanism 16 is mounted on the base plate or platform 22 and comprises a frame or main bracket 270 which is located in proper position longitudinally and laterally of said platform by a transversely extending key 271 and a stop block 272 disposed at right angles to said key and having threaded therein an adjustable stop bolt 273, said key and said block being suitably secured to the upper surface of the platform. The frame 270 is provided in the underside thereof with a suitable keyway to receive the key 271, and when so engaged, said frame is moved along said key and the platform 22 until it contacts the stop bolt 273, thus quickly and easily locating the mechanism 16 in its proper operating position in the machine. Following this, the frame 270 is immovably bolted to the platform 22. The frame 270 projects upwardly from the platform 22 outwardly of the conveyor 15 at the side guide side thereof and is formed with a horizontal shelf 274 which projects inwardly from said frame beneath said conveyor. The frame 270 has bolted or otherwise suitably secured to the top thereof a bracket 275 which projects inwardly from said frame over the conveyor 15.

The various operable parts of the cover sheet stripping mechanism 16 are driven through driving connections therefor with the cam shaft 50. For this purpose, the cam shaft 50 has keyed and suitably secured thereon between the frame 270 and the previously described cam supporting hub 228, a sprocket 276 around which passes a chain 277 which extends upwardly from said sprocket and also passes around a similar sprocket 278. This sprocket 278 is keyed and suitably secured on the outer end of one shaft 279 of a conventional angle gear drive unit 280 having another shaft 281 which is disposed at right angles to the shaft 279 and projects outwardly beyond opposite ends of said unit. Slack in the chain 277 is compensated for by an idler sprocket 282 which is journalled on and at the free end of an arm 283 which is adjustably clamped to a stud 284 secured in any suitable manner to the frame 270. The driven shaft 281 of the angle gear drive unit 280 has keyed and suitably secured thereon one part 285 of a conventional coupling 286, the other part 287 of which is keyed and suitably secured to one end of a short shaft 288 which is journalled in suitable bearings in the frame 270 and projects inwardly beyond said frame toward the conveyor 15. The shaft 288 is driven through the described driving connections therefor with the cam shaft 50 to make one complete revolution for each cycle of operation of the machine and, hence, the shaft 288 may be correctly referred to as the cam shaft for the cover sheet stripping mechanism 16.

The cam shaft 288 has keyed and suitably secured thereon a hub 289 to which is bolted or otherwise suitably secured a cam 290 which engages a cam follower 291 journalled on and at the free lower end of a lever 292. This lever 292 is releasably clamped for adjustment purposes at the upper end thereof to a short rock shaft 293. The shafts 288 and 293 extend transversely of the machine, and the shaft 293 is journalled at opposite ends thereof in suitable bearings provided in inner and outer portions of the bracket 275. The cam follower 291 is yieldingly held in engagement with the cam 290 by a coil extension spring 294 having one end thereof connected to the lever 292 and the opposite end connected at 295 to the conveyor frame 170. Keyed and suitably secured to the inner end of the rock shaft 293 is a spur pinion 296 which is disposed within a shallow chamber 297 formed in the inner face of the inner portion of the bracket 275. The inner portion of the bracket 275 is bifurcated to receive the rear end of an arm 298 which projects forwardly of said bracket above the conveyor 15. The arm 298 is releasably clamped for adjustment purposes at the inner end thereof to a short transverse pin 299 which is journalled in suitable bearings in the bracket 275 and has keyed and suitably secured thereto a spur pinion 300 which meshes with the spur pinion 296. The spur pinions 296 and 300 are normally concealed by a cover plate 301 which is removably secured in a suitable manner to the bracket 275. The arm 298 has secured in the free forward end thereof two pins 302 which are transversely aligned and spaced apart such that the distance between the axes thereof is equal to the distance between the axes of two of the holes 8 in the adhesive sheet 7 on the card 5 as spaced transversely or across the smaller dimension of said card. The card stopping finger 235 is so located longitudinally of the conveyor 15 that when the card 5 is moved into engagement with and stopped by said finger and is also engaged with the side guide bar 174, the two leading holes 8 in the adhesive sheet 7 on said card will be disposed in direct vertical alignment with the pins 302 on the arm 298.

It will thus be apparent that the rock shaft 293 is cam operated in one direction and spring operated in the opposite direction by the cam 290 and spring 294, respectively, and that as a result of such rocking movement of said shaft, the arm 298 and the pins 302 thereon will be rocked through the pinions 296 and 300 downwardly toward the conveyor 15 by the spring 294, and upwardly away from said conveyor by the cam 290. Under these conditions and with a card 5 properly positioned beneath the pins 302 against the stop finger 235 and the side guide bar 174, the pins 302 upon downward movement thereof will enter the two leading holes 8 in the adhesive sheet 7 on the stopped card and engage the cover sheet 9 rearwardly of the leading edge and adjacent the opposite corners thereof, and upon continued downward movement of said pins the latter will strip opposite corner portions of the cover sheet from the adhesive sheet and deflect said corner portions downwardly beyond the card supporting plate 172 through a suitable clearance opening formed in said plate, as clearly illustrated in FIG. 13 wherein the stripped and deflected corner portions of the cover sheet are indicated at 9a.

The stripped and deflected corner portions 9a of the cover sheet 9 are temporarily held by the pins 302 in their deflected positions shown in FIG. 13 until said corner portions are firmly gripped by a gripper which is arranged beneath the card supporting plate 172 and is operated in timed relation with the operation of the pins 302. After the deflected corner portions 9a of the cover sheet 9 are gripped by the gripper, the arm 298 and the pins 302 thereon are moved upwardly by and through continued rotation of the cam 290 and returned to their original positions in which said pins are disposed clear of the line of travel of the cards and clear of the card acted upon and at rest beneath the same on the conveyor 15, as clearly shown in FIGS. 4 and 6. As more clearly shown in FIGS. 6, 7 and 13, the gripper for gripping the deflected corner portions 9a of the cover sheet 9 comprises an upwardly and forwardly inclined lever form of gripper body 305 which is keyed and suitably secured at the lower end thereof to the inner end of a sleeve 306 which extends transversely of the conveyor 15. The sleeve 306 is slidably engaged over a short rock shaft 307 and is journalled on said rock shaft for rocking movement relative thereto. The rock shaft 307 is journalled at opposite ends thereof in suitable bearings provided in brackets 308 which are bolted or otherwise suitably secured to the shaft 274 and project forwardly of said shelf to receive said shaft.

The sleeve 306 has keyed to the outer end thereof a short vertical arm 309 to the lower free end of which is pivotally connected by a pin 310 the forward end of a connecting link 311. The link 311 is pivotally connected at the rear end thereof by a pin 312 to the free end of a forwardly curved laterally offset portion of a lever 313 which is located rearwardly of the cam shaft 288 and is loosely mounted at the upper end thereof on the rock shaft 293 for rocking movement relative to said shaft. The lever 313 has journalled thereon at 314 a cam follower 315 which engages a cam 316 that is bolted or otherwise suitably secured to the hub 289. The follower 315 is yieldingly held in engagement with the cam 316 by a coil extension spring 317 having one end thereof connected at 319 to the conveyor frame 170. It will thus be apparent that the gripper body 305 is rocked by the cam 316 in a clockwise direction, i.e., forwardly and downwardly, from the position thereof shown in FIG. 6, and is returned to said position by the contracting action of the spring 317 under the control of said cam. The cam 316 and the described operating connections for the gripper body 305 are so chosen that said gripper body is rocked during each cycle of operation of the machine from the normal full line position shown in FIG. 12 to substantially the broken line position thereof shown in said figure, and that such rocking movement occurs at a speed which is accelerated to substantially the surface speed of the card 5 in moving from the cover sheet stripping mechanism 16 at the first locality toward the mechanism 17 at the second locality along the conveyor 15.

The gripper body 305 is formed at the top thereof with two transversely spaced cover sheet gripping surfaces 320 which are downwardly inclined forwardly and outwardly to receive the stripped and deflected corner portions 9a of the cover sheet 9 at substantially the same angle of inclination thereof. Disposed at opposite sides of the gripper body 305 are two gripper jaws 321 and 322 having jaw portions 323 which project inwardly over and cooperate with the gripping surfaces 320 on said body to grip the stripped and deflected corner portions 9a of the cover sheet 9 therebetween. The gripper jaw 321 is suitably secured to the upper surface of a rearwardly extending actuating arm 324, and the gripper jaw 323 is suitably secured to the outer surface of a collar 325 which is formed on one end of a transverse stub shaft 326 that is journalled in a suitable bearing in the gripper body 305 and has the arm 324 suitably secured to the other end thereof. The arm 324 has journalled thereon at the free rear end thereof a cam roller 327 which is engaged in a cam groove 328 formed in the adjacent surface of a vertically extending segmental cam 329 which is keyed at the lower end thereof to the previously described rock shaft 307.

The rock shaft 307 has keyed thereto a short vertical arm 330 to the lower free end of which is pivotally connected by a pin 331 the forward end of a connecting link 332. The link 332 is pivotally connected at the rear end thereof by a pin 333 to the free end of a forwardly curved laterally offset portion of a lever 334 which is also located rearwardly of the cam shaft 288 and is also loosely mounted at the upper end thereof on the rock shaft 293 for rocking movement relative to said rock shaft. The lever 334 has journalled thereon at 335 a cam follower 336 which engages a cam 337 that is bolted or otherwise suitably secured to the hub 289. The follower 336 is yieldingly held in engagement with the cam 337 by a coil extension spring 338 having one end thereof connected at 339 to the segmental cam 329 and the opposite end connected at 340 to the gear box 30. It will thus be apparent that the segmental cam 329 is rocked by the cam 337 in a clockwise direction from the normal position thereof shown in FIG. 5, and is returned to said position by the contracting action of the spring 338 under the control of the cam 337.

The contour of the cam 337 is so chosen, and the operation of the segmental cam 329 is so timed, that during each cycle of operation of the machine, said segmental cam is initially rocked relative to the gripper body 305 in a clockwise direction from the position thereof shown in FIG. 5 to the full line position shown in FIG. 12, and then continued in said direction in unison with and at the same accelerated speed as that of said gripper body. Under these conditions, the gripper jaws 321 and 322 will, through engagement of the cam roller 327 in the cam groove 328 in the segmental cam 329, be first rocked toward the gripper body 305 to closed positions on the deflected corner portions 9a of the cover sheet 9, as shown in FIG. 12, and upon rocking movement of said gripper body from the full line position to the broken line position thereof shown in FIG. 12, said cover sheet will be progressively peeled completely from the adhesive sheet 7 through the open end of the card aperture 6 and the opening in the plate 172, and carried away from the card 5 to a position clear of said card and said plate, as shown in broken lines in FIG. 12. Thereupon the segmental cam 329 is again first rocked relative to the gripper body 305 but in the return direction, and then continued in said direction in unison with the return movement of said gripper body, whereby the gripper jaws 321 and 322 are first rocked away from the gripper body to open positions, thus releasing the peeled cover sheet 9, and said gripper body and the segmental cam are returned to their original positions in readiness to act on the next card during the next cycle of operation of the machine.

The operation of the gripper body 305 is so timed that rocking movement of said gripper body in the cover sheet stripping or peeling direction occurs after the card 5 is released by the stop finger 235 and as said card is being advanced by the conveyor beyond said stop finger toward the next or succeeding mechanism. In this manner, rocking forward-downward movement of the gripper body 305 is accompanied by forward movement of the card 5, whereby accurate peeling of the cover sheet 9 progressively from the adhesive sheet 7 is achieved without tearing said adhesive sheet and without displacing the card relative to the conveyor by said peeling action. Preferably, the rocking forward-downward movement of the gripper body 305 and the starting of the card 5 from its arrested position are so relatively initiated that a minute slack in the cover sheet 9 is developed before said gripper body reaches its maximum speed and can place the cover sheet 9 under tension.

The card supporting plate 172 is undercut considerably at the location of the gripper body 305, as indicated at 341, so as to advantageously locate said body as close as possible to the card 5 resting on said plate and thereby decrease the extent of deflection of the corner portions 9a of the cover sheet 9 by the pins 302. The jaw portions 323 of the gripper jaws 321 and 322 are provided with notches 342 in the rear edges thereof to receive the pins 302 therein and thereby permit said jaw portions to fully close on the stripped and deflected corner portions 9a of the cover sheet 9. Additionally the jaw portions 323 of the gripper jaws 321 and 322 are provided with small pointed pins 343 which cooperate with corresponding depressions or recesses 344 formed in the gripping surfaces 320 on the gripper body 305 to either pierce or indent the deflected corner portions 9a of the cover sheet 9 and thereby augment the gripping action of said jaws so as to prevent slipping of said corner portions relative to and from between said jaws and said gripper body during the peeling of said cover sheet from the card. If desired, the pins 343 may be carried by the gripper body 305, and the companion recesses 344 may be formed in the gripper jaw portions 323.

The cover sheet 9 is supported by a curved plate-like backing member 345 during peeling thereof from the adhesive sheet 7 on the card 5 by the gripper and while the same is carried by said gripper to a position clear of said card, as hereinbefore described. The backing member 345 is of one-piece construction and is fabricated from electrically conductive material, such as sheet steel, for a purpose to be hereinafter described. The backing member 345 is slightly larger in length and width than the cover sheet 9 and is formed with side extensions 346 which straddle the gripper body 305 and by means of which said backing member is pivotally mounted intermediate the ends of said extensions, as at 347, on and at the top of said gripper body. The backing member 345 projects rearwardly of the gripper body 305, and the free forward ends of the extensions 346 of said backing member are connected together by a spreader bar 348. The gripper body 305 is recessed, as indicated at 349, at the top thereof to provide sufficient space for the spreader bar 348 to enable pivotal movement of the backing member 345 about its pivot 347.

The above described swinging movement of the backing member 345 into and out of its operative cover sheet supporting position is effected respectively in response to the closing and opening of the gripper jaws 321 and 322. For this purpose, the spreader bar 348 of the backing member 345 has connected thereto one end of a relatively light coil extension spring 350 the opposite end of which is connected at 351 to the gripper body 305. The spring 350 tends at all times to yieldingly swing the backing member 345 about its pivot 347 in a clockwise direction, as view in FIG. 6. Suitably secured in the actuating arm 324 for the gripper jaws 321 and 322 is a short pin 352 which projects laterally from said arm beneath the adjacent side extension 346 of the backing member 345. As shown in FIG. 6, the pin 352 is so located on the arm 324 that in the normal relative positions of said arm and the gripper body 305 with the gripper jaws 321 and 322 in open positions, the adjacent side extension 346 of the backing member 345 is engaged by said pin and through such engagement said backing member is disposed in its normal inoperative position and held against pivotal movement by the spring 350.

It will thus be apparent that when, as shown in FIG. 12, the arm 324 is rocked by the segmental cam 329 to close the gripper jaws 321 and 322 into gripping engagement with the stripped and deflected corner portions 9a of the cover sheet 9, as hereinbefore described, the pin 352 will be moved out of engagement with the adjacent side extension 346 of the backing member 345 and away therefrom a predetermined extent, thus releasing said backing member and permitting pivotal movement thereof by the spring 350 to its operative position. It will also be apparent that when the backing member 345 in its operative position has travelled clear of the card supporting plate 172 upon forward-downward pivotal movement thereof with the gripper body 305 and the gripped cover sheet 9, said backing member will be swung farther forwardly by the action of the spring 350, said movement of said backing member, however, being limited to the broken line position thereof shown in FIG. 12, through engagement of the side extension 346 with the pin 352. When the gripper jaws 321 and 322 are opened to release the peeled cover sheet 9 at the end of the active stroke of the gripper body 305, the backing member 345 in response to said gripper jaw operation is immediately retracted to its inoperative position through movement of the arm 324 and engagement of the pin 352 with the side extension 346, said backing member remaining in said inoperative position during the return movement thereof with the gripper body 305 and until the gripper jaws 321 and 322 are again closed in the next cycle of operation of the machine. When the backing member 345 is retracted to its inoperative position, said backing member and the gripper body 305 occupy the relative positions thereof shown in FIG. 6, thus permitting return movement of the backing member without striking the card supporting plate 172.

Means are provided to positively remove the peeled cover sheet 9 from the gripper when the same is released by the gripper jaws 321 and 322 at the end of the active stroke of the gripper body 305, thus assuring that said gripper is cleared of the cover sheet before the same is returned to its original position to act on the next card 5 during the next cycle of operation of the machine. As herein shown, said means comprises a small diameter idler roller 353 which is located at the top and centrally of the gripper body 305 and is disposed within a suitable clearance groove in said gripper body. The idler rolller 353 is journalled at 354 on the gripper body 305 and it operates between the gripping surfaces 320 and the gripper jaws 321 and 322 on said gripper body, whereby said roller will be overlapped by the front edge portion of the cover sheet 9 gripped by said surfaces and said jaws and being peeled from the card 5. The idler roller 353 projects slightly above the gripping surfaces 320 on the gripper body 305 and it cooperates with a large diameter rubber-tired roller 355 which is disposed adjacent the path of rocking movement of said gripper body such that it will be engaged by the peeled cover sheet 9 as the gripper body approaches the end of its active forward-downward stroke. The rubber-tired roller 355 is journalled on a transverse stub shaft 356 which is fixed at one end thereof in a bracket 357 which is bolted or otherwise suitably secured to the conveyor frame 170. The rubber-tired roller 355 is driven continuously in the cover sheet peeling direction, and for this purpose, said roller has secured thereto or formed integrally therewith a spur pinion 358 which meshes with and is driven by a similar pinion 359 which is fixed on the driven shaft 183 which carries the inclined conveyor roller 177. The pinions 358 and 359 are of the same size and the rubber-tired roller 355 is of the same diameter as that of the driven conveyor rollers and, hence, said rubber-tired roller is driven at a relatively fast surface speed the same as that of said conveyor rollers.

It will thus be apparent that as the gripper body 305 with the peeled cover sheet 9 moves to the end of its active stroke, the idler roller 353 will pass the rubber-tired roller 355 and in so doing it will momentarily press said cover sheet into contact with said rubber-tired roller. Under these conditions and since the cover sheet 9 is still gripped by the gripper jaws 321 and 322, the rubber-tired roller 355 will be ineffective to remove said cover sheet from the gripper body 305. However, when the peeled cover sheet 9 is released at the end of the active stroke of the gripper body 305 through opening of the gripper jaws 321 and 322 and said gripper body is returned to its original position, as hereinbefore described, the idler roller 353 will again move past the driven rubber-tired roller 355 and momentarily press the now released cover sheet against said rubber-tired rollers, whereupon said cover sheet will be quickly ejected from said gripper body through rotation of the rubber-tired roller in the cover peeling direction which action is augmented by the movement of the gripper body in the opposite direction. A suitable waste receptacle (not shown) is provided in the machine and located beneath the rubber-tired roller 355 to receive the peeled and ejected cover sheets 9.

Detector means is provided and associated with the cover sheet gripper comprising the gripper body 305 and gripper jaws 321 and 322 for detecting the presence and absence of a peeled cover sheet 9 during rocking movement of said gripper in the cover sheet peeling direction, and causing stopping of the machine in the event a cover sheet is not present and gripped by the gripper during such rocking movement thereof. As herein shown, said detecting means includes the cover sheet backing member 345, and comprises an elongated feeler finger or probe 360 which extends longitudinally of the machine and is formed of electrically conductive material, such as brass. The feeler finger 360 is located so that the backing member 345 or the peeled cover sheet 9 supported thereby will yieldingly contact and wipe along the free rear end of said feeler finger upon each forward-downward movement of said backing member with the gripper body 305 and forward pivotal movement thereof by the spring 350. The feeler finger 360 is arranged to contact the backing member 345 centrally thereof and is slidably engaged at the forward end thereof in a suitable opening formed in a block 361 of insulating material, such as fiber, which is suitably secured to the conveyor frame 170. The feeler finger 360 is adjustably clamped in the block 361 by a contact element 363 which is carried by said block and extends at right angles to said feeler finger. The contact element 362 has connected thereto one end of a conductor 363 which, together with the backing member 345, is connected in the electrical control circuit for the machine. The backing member 345 forms in effect a circuit terminal and is connected in the electrical control circuit to ground through the frame structure of the machine which is represented by the conductor 364 in said figure.

It will be apparent that as long as the backing member 345 is shielded by a peeled cover sheet 9 during each forward-downward movement of the gripper during the normal operation of the machine, the feeler finger 360 will not be directly contacted by said backing member and, hence, the electrical control circuit in which said backing member and said feeler finger are connected will remain open or broken and the machine will continue to operate in its usual normal manner. However, should the cover sheet stripping and deflecting pins 302 fail, for some reason, to strip and/or deflect the corner portions 9a of the cover sheet 9 so that the gripper jaws 321 and 322 cannot grip the same, or should said gripper jaws fail, for some reason, to grip the stripped and deflected corner portions of the cover sheet, the backing member 345 being thus exposed in either case will directly contact and wipe along the feeler finger upon forward-downward movement thereof with the gripper, thus closing the circuit to effect stopping of the machine in a manner to be hereinafter described.

As previously described, the backing member 345 is slightly longer than the length of the cover sheet 9 and, hence, said backing member will project slightly beyond the trailing edge of the peeled cover sheet supported thereby. In order to prevent a false detecting operation by the feeler finger 360 and unnecessary stopping of the machine through contact of said feeler finger with the unshielded rear edge portion of the backing member 345 protruding beyond the trailing edge of the peeled and gripped cover sheet 9, said backing member is provided with a gap 365 centrally and at the rear edge thereof, and a strip 366 of insulating material, such as fiber, is secured to the underside of the backing member and extends across said gap.

While only one embodiment of the present invention has been described in the foregoing specification and illustrated in the accompanying drawings it will be apparent that various omissions and substitutions and changes in form and details of the machine illustrated and its operation may be made by those skilled in the art without departing from the spirit and scope of the invention. The present invention may be associated or embodied with other card processing mechanisms as shown in our said copending application. It is not intended, however, that the present invention shall be limited to the embodiment shown nor otherwise than the terms of the appended claims.

What is claimed is:

1. Apparatus for removing from a card a protective cover sheet disposed within an aperture in said card and removably adhering to an adhesive sheet secured to one face of said card, the combination of a support for said card, means disposed at one side of the card and operable through the adhesive sheet for initially stripping an edge portion of the cover sheet from said adhesive sheet and deflecting said edge portion beyond the plane of the other side of said card and other means disposed at said other side of said card for peeling the remaining portions of said cover sheet from said adhesive sheet through said card aperture end beginning with said deflected edge portion of said cover sheet.

2. Apparatus for removing from a card a protective cover sheet disposed within an aperture in said card and detachably adhering to an adhesive sheet secured to one face of said card, comprising a support for the card having an opening therein registering with the open end of the aperture in said card, pin means arranged at one side of said support and operable through the adhesive sheet for initially stripping an edge portion of the cover sheet from said adhesive sheet and deflecting said portion through said card aperture end and through said support opening, gripper means arranged at the other side of said support and operable to grip said deflected edge portion of said cover sheet and to peel the latter from said adhesive sheet through said card aperture end and said support opening, means for operating said pin means, and means for operating said gripper means.

3. Apparatus for removing from a card a protective sheet disposed within an aperture in said card and removably adhering to an adhesive sheet secured to one face of said card, the combination of means to feed a card in a predetermined path, a cover removing station in said path, means to stop a card at said station for a predetermined time and to release said card for movement in said path, pin means at said station and disposed at one side of the card and operable through the adhesive sheet while said card is stopped for initially stripping opposite corner portions of the cover sheet from said adhesive sheet and deflecting said portions beyond the plane of the card through the open end of the aperture in said card, means for operating said pin means in timed relation to the operation of the card stopping means, gripper means disposed at the other side of said card and comprising a pivoted body having a cover sheet gripping surface thereon, gripper jaws pivotally mounted on said body to grip said deflected portions of said cover sheet against said surface, means for operating said gripper jaws toward and away from said surface, and means for moving said body through an arcuate path away from said predetermined path simultaneously with the releasing of said card at said station so as to progressively peel the gripped cover sheet from said adhesive sheet.

4. Apparatus as defined in claim 3, comprising cooperating means on said surface and said jaws for augmenting the effective gripping action of said jaws.

5. Apparatus as defined in claim 4 wherein said cooperating means comprises pointed pins on said gripper jaws and companion recesses in said surface.

6. Apparatus as defined in claim 3 wherein said gripping surface and said gripper jaws are shaped to conform substantially to the shape of the deflected corner portions of the cover sheet.

7. Apparatus as defined in claim 3, comprising a backing member for supporting said cover sheet during peeling and transferring thereof and mounted on said body for pivotal movement into and out of operative position in response to the movement of said gripper jaws to closed and open positions, respectively.

8. Apparatus for removing from a card a protective cover sheet disposed within an aperture in said card and removably adhering to an adhesive sheet secured to one face of said card, the combination of a support for the card, means to feed a card to said support, means to transport said card away from said support, pin means disposed at one side of the card and operable through the adhesive sheet for initially stripping opposite corner portions of the cover sheet from said adhesive sheet and deflecting said portions beyond the plane of the card through the open end of the aperture in said card, means for operating said pin means while said card is at said station and before the operation of the means to transport said card from said station, gripper means disposed at the other side of said card and comprising a pivotal body having a cover sheet gripping surface thereon, and two gripper jaws pivotally mounted on said body to grip said deflected portions of said cover sheet against said surface, means for operating said gripper jaws toward and away from said surface to closed and open positions, and means for rocking said body simultaneously with the operation of said means to transport said card away from said support so as to progressively peel the gripped cover sheet from said adhesive sheet, a backing member formed of electrically conductive material for supporting said cover sheet during peeling and transferring thereof and mounted on said body for pivotal movement into and out of operative position in response to the movement of said gripper jaws, detecting means in the form of a fixed electrical contact member arranged adjacent the path of movement of said gripper means so as to be engaged by said backing member upon failure of said gripper means to peel the cover sheet from the card, engagement of said fixed member with said backing member being normally prevented by the cover sheet gripped by said gripper means, said fixed member and said backing member being connected in an electric control circuit for the machine and upon contact thereof affecting said circuit to cause stopping of the machine.

9. Apparatus for removing from a card a protective cover sheet disposed within an aperture in said card and detachably adhering to an adhesive sheet secured to one face of said card, comprising means for moving successive cards through a predetermined path, a cover sheet removing station operatively positioned along said path, means to stop each card at said station for a predetermined length of time and then to release each card for movement in said path, means arranged at one side of said card at said station for initially stripping a corner portion of the cover sheet from said adhesive sheet and deflecting said corner portion through said card aperture and into the area at the other side of said card, gripper means arranged at the other side of said card at said station and operable to grip said deflected corner portion of said cover sheet, means operable simultaneously with the release of the card at said station for moving said gripper means in an arcuate path away from said card path so as to peel said cover sheet from said adhesive sheet and means timed with said movement of the gripper means for operating said gripper means to grip the deflected corner portion of said cover sheet and to release the peeled cover sheet.

10. Apparatus as defined in claim 9, comprising means for removing the peeled cover sheet from said gripper means when released thereby.

11. Apparatus for removing from a card a protective cover sheet disposed within an aperture in said card and removably adhered to an adhesive sheet secured to one face of said card, means for supporting and advancing successive cards in spaced relation along a predetermined path, means disposed along said predetermined path and at one side of the card and operable through the adhesive sheet for initially stripping an edge portion of said cover sheet beyond the plane of the card through the open end of the aperture in said card, and other means disposed at the other side of said card for progressively peeling said cover sheet from said adhesive sheet through said card aperture end beginning with said edge portion of said cover sheet while said card is being advanced by said advancing means.

12. Apparatus for operating on cards each having an aperture therein, an adhesive sheet secured over said aperture at one face of the card, and a protective cover sheet within the aperture and removably adhering to said adhesive sheet, the combination of a continuously driven conveyor means for advancing successive cards in spaced relation along a predetermined path, operable means along said path for stripping the cover sheet from each card, operable stop means for arresting the movement of each card at said cover sheet stripping means, means for moving said stop means into and out of said path during each cycle of operation of said cover sheet stripping means whereby a card will be arrested and released during each apparatus cycle, and wherein said cover sheet stripping means comprises pin means disposed at one side of the card and operable through the adhesive sheet for initially stripping a transverse edge portion of the cover sheet from said adhesive sheet and deflecting said portion beyond the plane of the card through the open end of the aperture in said card, means for operating said pin means, pivoted gripper means disposed at the other side of said card for progressively peeling said cover sheet from said adhesive sheet through said card aperture end, means for rocking said gripper means in timed relation to the operation of the means for stopping and releasing said card on said conveyor and in an arcuate path so that said gripper means moves away from the path of the released and moving card and at substantially the same surface speed thereof, and means for operating said gripper means in timed relation with the operation of said pin means and with such rocking movement thereof to respectively grip said deflected portion of said cover sheet and to release said cover sheet when peeled from said adhesive sheet.

13. Apparatus as defined in claim 12 wherein said gripper means comprises a fixed jaw and a pivotal jaw, and said gripper operating means comprises a pivotal cam, and means for imparting pivotal movement to said cam in unison with such rocking movement of said gripper means and for imparting pivotal movement thereto relative to said gripper means to effect pivotal movement of said pivotal jaw toward and away from said fixed jaw to closed and open positions, respectively.

14. Apparatus as defined in claim 12, comprising means arranged adjacent the path of movement of said gripper means to engage the peeled cover sheet released by said gripper means and remove the same from said gripper means.

15. Apparatus for operating on cards each having an aperture therein, an adhesive sheet secured over said aperture at one face of the card, and a protective cover sheet within the aperture and removably adhering to said adhesive sheet, the combination of a continuously driven conveyor means for advancing successive cards in spaced relation along a predetermined path, operable means along said path for stripping the cover sheet from each card, operable stop means for arresting the movement of each card at said cover sheet stripping means, means for moving said stop means into and out of said path during each cycle of operation of said cover sheet, stripping means whereby a card will be arrested and released during each apparatus cycle, and wherein said cover sheet stripping means comprises pin means disposed at one side of the card and operable through the adhesive sheet for initially stripping a transverse edge portion of the cover sheet from said adhesive sheet and deflecting said portion beyond the plane of the card through the open end of the aperture in said card, means for operating said pin means, pivoted gripper means comprising a fixed jaw and a pivotal jaw disposed at the other side of said card for progressively peeling said cover sheet from said adhesive sheet through said card aperture end, means for rocking said gripper means in timed relation to the operation of the means for stopping and releasing said card on said conveyor and in an arcuate path so that said gripper means moves away from the path of the released and moving card and at substantially the same surface speed thereof, and means for operating said gripper means in timed relation with the operation of said pin means and with such rocking movement thereof comprising a pivotal cam, and means for imparting pivotal movement to said cam in unison with such rocking movement of said gripper means and for imparting pivotal movement thereto relative to said gripper means to effect pivotal movement of said pivotal jaw toward and away from said fixed jaw to closed and open positions, respectively, and means arranged adjacent the path of movement of said gripper means for removing the peeled cover sheet from said gripper means comprising a roller continuously driven in the direction of movement of said gripper means in peeling said cover sheet from the adhesive sheet, and said gripper means is provided with an idler roller which cooperates with said driven roller and is overlapped by the peeled cover sheet.

16. Apparatus as defined in claim 15 wherein said driven roller is arranged to contact the peeled cover sheet as said gripper means approaches the end of its movement and is effective to remove said cover sheet from said gripper means upon the release of said cover sheet at said end by said gripper means.

17. Apparatus as defined in claim 15 wherein said gripper means is returned to the original cover sheet gripping position thereof substantially immediately following the release of the cover sheet thereby so as to augment the effective action of said driven roller.

18. Apparatus as defined in claim 15, comprising means arranged adjacent the path of movement of said gripper means for detecting the failure of said gripper means to grip and peel the cover sheet from said adhesive sheet, and means operative in response to such detection by said detecting means for causing a desired control action such as stopping of the machine.

19. Apparatus as defined in claim 18 wherein said cover sheet detecting means comprises a fixed electrical contact member, and a companion electrical contact member carried by and movable with said gripper means, said companion contact member being arranged to engage and sweep along said fixed contact member upon failure of said gripper means to peel the cover sheet from the adhesive sheet and to be shielded by the cover sheet as the same is advanced by said gripper means past said fixed contact member thereby preventing engagement of said companion member with said fixed member, said contact members being connected in an electric control circuit for the machine and upon contact thereof affecting said circuit to cause stopping of the machine.

20. Apparatus for removing a cover sheet from apertured cards comprising means for feeding said cards in a predetermined path, a cover sheet removing station in said path, means to stop each card at said station for a predetermined length of time and then to release the same, means positioned at one side of said card for deflecting an edge of said cover sheet while said card is stationary, means positioned at the other side of said card for gripping said deflected edge of said cover sheet, means for arcuately moving said gripping means away from said card simultaneously with the release of said card whereby as said card is moved away from said station the cover sheet is progressively peeled from said card.

References Cited by the Examiner

UNITED STATES PATENTS

| | | | |
|---|---|---|---|
| 1,459,693 | 6/27 | Rand et al. | 154—120 |
| 2,560,301 | 7/51 | Morrison | 154—1 |
| 2,711,984 | 6/55 | Kingman | 154—120 |
| 2,780,284 | 2/57 | Wisti | 154—1 |

EARL M. BERGERT, *Primary Examiner.*

CARL F. KRAFFT, ALEXANDER WYMAN,
*Examiners.*